UNITED STATES PATENT OFFICE 2,551,575

ESTERS OF SULFO - 4 - CYCLOHEXENE - 1,2 - DICARBOXYLIC ACID AND PROCESS FOR PRODUCING SAME

George D. Martin, Upper Darby, and Richard S. Wilder, Elkins Park, Pa., assignors to Publicker Industries Inc., Philadelphia, Pa., a corporation of Pennsylvania No Drawing. Application October 12, 1946, Serial No. 702,886

5 Claims. (Cl. 260—468)

The present invention relates to esters of sulfo-4-cyclohexene-1,2-dicarboxylic acid and to uses therefor and to processes for making same.

An object of the present invention is to provide, as new compounds, esters of sulfo-4-cyclohexene-1,2-dicarboxylic acid for various important commercial uses. Another object of the present invention is to provide a new process for preparing esters of sulfo-4-cyclohexene-1,2-dicarboxylic acid.

Other objects and advantages of the present invention are apparent in the following detailed description and appended claims. While somewhat similar compounds have been known in the past (see, for example, U. S. Patent 2,028,091 on the preparation of esters of sulfo aliphatic dicarboxylic acids; U. S. Patent 2,314,846 on esters of sulfo cis-endomethylene-3,6-Δ-4-tetrahydrophthalic acid; and British Patent 418,334 on polyvalent metal salts of an ester of an aromatic sulfodicarboxylic acid), sulfonated esters of 4-cyclohexene-1,2-dicarboxylic acid have not, to our knowledge, been heretofore prepared.

We have now succeeded in preparing these esters as new compounds and have found that they have valuable surface active properties which make them useful as wetting and foaming agents and detergents.

We have prepared these new compounds by treating esters of 4-cyclohexene-1,2-dicarboxylic acid with a suitable sulfonating agent such as chlorosulfonic acid.

Alternatively, we have prepared these products by first sulfonating 4-cyclohexene-1,2-dicarboxylic anhydride with a suitable sulfonating agent such as sulphuric acid, and thereafter esterifying the product. A wide variety of alcohols may be used in the esterification step, including, for example: methyl, ethyl, butyl, hexyl, octyl and lauryl alcohols or mixtures thereof. However, it is desirable that at least one of the ester groups contain three or more carbon atoms in order for the sulfo ester to possess marked wetting properties.

While we do not wish to limit ourselves to theoretical considerations, we believe that the products formed are sulfo derivatives of the unsaturated compound rather than simple acid sulfate addition compounds, since they are not easily hydrolyzed. The probable structure of our new compounds may be represented by the following formula:

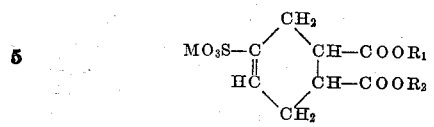

where M is a member selected from the group consisting of hydrogen, a metal radical, an ammonium radical and an organic base radical, $R_1$ is a member selected from the group consisting of an alkyl group and an aryl group, $R_2$ is a member selected from the group consisting of hydrogen, a metal radical, an ammonium radical, an organic base radical, an alkyl group and an aryl group.

The following are illustrative but not restrictive examples of the present invention, all parts being by weight:

Example 1

400 parts of concentrated sulfuric acid was added to 608 parts of 4-cyclohexene-1,2-dicarboxylic anhydride with stirring and cooling. The temperature was then slowly raised to 115° C. over a period of about a half-hour and maintained at about 115° C. until a test sample was completely soluble in a small amount of water. 1040 parts of 2-ethylhexanol was then added and heating continued at about 115° until a test sample was completely soluble in water. The mixture was then cooled and neutralized by the addition of 10% sodium hydroxide. The resulting product consisted chiefly of diethylhexyl ester of the 4-sulfo-cyclohexene-1,2-dicarboxylic acid, as the sodium salt in aqueous solution. This product was found to possess excellent wetting properties at a concentration of 0.03%. The sodium di-(2-ethylhexyl) sulfo-tetrahydrophthalate formed by this process was found to have unusually good wetting and dispersing properties.

Example 2

38 parts of 4-cyclohexene-1,2-dicarboxylic anhydride was suspended in 200 parts of carbon tetrachloride and 29 parts of chlorosulfonic acid added drop-wise while stirring. Hydrogen chloride was liberated and a resinous mass separated from the carbon tetrachloride solution. A test showed that this material was completely water soluble. 65 parts of 2-ethylhexanol was then added and the temperature slowly raised during a period of about one-half hour to about 115° C. and maintained at this temperature for about 3½ hours, or until a test showed reaction to be complete. The mixture was then cooled, 120 parts of water added, volatile organic material evaporated off, and the aqueous solution neutralized with 17 parts of soda ash.

This product was found to have substantially the same wetting properties as that obtained in Example 1.

Example 3

40 parts of dioctyl 4-cyclohexene-1,2-dicarboxylate was placed in a reactor and 12 parts of chlorosulfonic acid added slowly while stirring. Hydrogen chloride was liberated. The temperature was gradually raised to 90° C. over a period of 4 hours and until a sample showed solubility in water. The resulting mixture was cooled, dissolved in water and neutralized with 7 parts of soda ash. The product was substantially the same as that obtained in Examples 1 and 2.

Example 4

38 parts of 4-cyclohexene-1,2-dicarboxylic anhydride was mixed with 25 parts of 98% sulfuric acid and heated at about 92° C. until the product was water soluble. After cooling to 60° C., 32 parts of 2-ethylhexanol was added and the mixture heated at 80° C. until a sample was completely soluble in water. After cooling, the product, consisting chiefly of mono-ethylhexyl ester of 4-sulfo-cyclohexene-1,2-dicarboxylic acid, was diluted with water and neutralized by addition of soda ash.

Example 5

76 parts of 4-cyclohexene-1,2-dicarboxylic anhydride was sulfonated with 50 parts of concentrated sulfuric acid by heating at 80° C. for 3 hours. 23 parts of ethyl alcohol was then added and heating continued at 80° C. for 2 hours when 65 parts of 2-ethylhexanol was added and the temperature raised to 115° C. for an additional 3 hours. The resulting mixed ester was neutralized as before. This product was found to be considerably less effective as a wetting agent than the product of Example 1.

Example 6

38 parts of 4-cyclohexene-1,2-dicarboxylic anhydride, 25 parts of concentrated sulfuric acid and 65 parts of 2-ethylhexanol were reacted together as described in Example 1. The resulting product was neutralized with 25 parts of mono-ethanolamine. The ethanolamine salt was found to have better wetting properties than the sodium salt on a weight basis.

Example 7

130 parts of di-n-butyl ester of 4-cyclohexene-1,2-dicarboxylic acid was gradually heated up to 90° with 46 parts of 98% sulfuric acid and the temperature maintained at about 90° for 4 hours. After cooling, the mixture was neutralized with a solution of 42 parts of soda ash in 200 parts of water. The resulting mixture was then extracted with ligroin to remove water insoluble oil and the water layer evaporated on a steam bath. 89 parts of a cream colored, water soluble powder was thus obtained. This product possessed marked surface active properties.

A number of other sulfo esters of 4-cyclohexene-1,2-dicarboxylic acid have been prepared in a similar manner. These are: dihexyl; dicapryl; dilauryl; dibenzyl; methyl, octyl; butyl, octyl; ethyl, lauryl; butyl, lauryl; monooctyl; and monolauryl. Esters containing a total of about 8–16 carbon atoms in the side chains were most effective as wetting agents. The higher molecular weight esters have better emulsifying and detergent properties.

The sulfo esters which we have prepared in the manner described above have wetting and detergent properties which make them useful in wetting, detergent, dispersing, emulsifying, and foaming processes; in processing and in improving textiles; in the preparation of sizing compositions; in dye assistants; in the leather industry for wetting agents in soaking, deliming, bating, cleaning, scouring and fulling and filling assistants; in waxes and polishes; shampoos; dentifrices; in the paper industry as penetrants for cooking pulp and the like; in latex stabilization; for prevention of pelting in electroplating; in pigment dispersion for grinding; in cosmetic creams; in fungicide and insecticide sprays; and for breaking petroleum emulsions of the water in oil type. Other uses will be apparent to those skilled in the art.

From the foregoing it is apparent that the various esters of sulfo-4-cyclohexene-1,2-dicarboxylic acid (all of which are believed to be new compounds, never heretofore prepared) possess important utility in various industrial fields.

There is nothing in the disclosure of the prior art of which we are aware which indicates that stable sulfo derivatives of 4-cyclohexene-1,2-dicarboxylic acid can be prepared in the simple manner of the present invention and this result is believed to be quite unexpected and unforeseeable.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. A process which comprises adding about 400 parts of concentrated sulfuric acid to about 608 parts of 4-cyclohexene-1,2-dicarboxylic anhydride with stirring and cooling, slowly raising the temperature to about 115° C. over a period of a half-hour, maintaining the temperature at about 115° C. until the mixture is completely soluble in water, thereby to sulfonate the cyclohexene ring, adding about 1040 parts of 2-ethylhexanol, heating further at 115° C. until the mixture is completely soluble in water, thereafter cooling and neutralizing with an alkali.

2. A process including the steps of gradually adding to 4-cyclohexene-1,2-dicarboxylic anhydride a sulfonating agent selected from the group consisting of sulfuric acid and chlorsulfonic acid, while cooling the mixture, thereafter heating the mixture so as slowly to raise the temperature to about 80–115° C. and maintaining the reaction mixture substantially at the maximum temperature until it shows substantially complete solubility in water, thereby to sulfonate the cyclohexene ring.

3. A process including the step of gradually heating a member of the group consisting of 4-cyclohexene-1,2-dicarboxylic acid, its anhydride and its methyl, ethyl, butyl, hexyl, octyl and lauryl esters to about 90° C. with a sulfonating agent selected from the group consisting of sulfuric acid and chlorsulfonic acid, and maintaining the mixture at the maximum temperature for about 4 hours, thereby to sulfonate the cyclohexene ring.

4. As a new composition of matter, the product formed by the process of claim 1.

5. As new compositions of matter, the products formed by the process of claim 2.

GEORGE D. MARTIN.
RICHARD S. WILDER.

REFERENCES CITED

The following references are of record in the file of this patent:

UNITED STATES PATENTS

| Number | Name | Date |
|---|---|---|
| 2,314,846 | McClellan et al. | Nov. 23, 1943 |
| 2,355,592 | Kosmin | Aug. 8, 1944 |
| 2,403,038 | Aelong | July 2, 1946 |

FOREIGN PATENTS

| Number | Country | Date |
|---|---|---|
| 708,429 | Germany | June 12, 1941 |